Sept. 21, 1943. P. M. CLAYTON 2,329,829
ENGINE MOUNTING
Filed July 27, 1942

Inventor
Paul M. Clayton
By Blackmor, Spencer & Hirt
Attorneys

Patented Sept. 21, 1943

2,329,829

UNITED STATES PATENT OFFICE 2,329,829

ENGINE MOUNTING

Paul M. Clayton, Detroit, Mich., assignor to General Motors Corporation, Detroit, Mich., a corporation of Delaware Application July 27, 1942, Serial No. 452,477

4 Claims. (Cl. 248—7)

This invention relates to an improved engine mounting and more particularly to a mounting arrangement for cushioning vibration and which is more flexible or less resistant to relative motions in certain directions than in others to provide stabilization of the suspended unit on a desired selected axis and a certain freedom of motion about such axis under resilient restraint for damping disturbing forces. While resilient mountings are helpful in damping and reducing transmission of vibratory forces the utmost benefit is had only if the mountings are properly designed and arranged for given types of installations and it is an object of the present invention to provide a mounting arrangement which is especially useful for the installation of an internal combustion engine having as a unit therewith a power take off whose axis is remote from the engine crankshaft center line.

A further object of the invention is to construct and arrange the several points of support and the cushioning rubber therein in relation to one another and to the engine and its offset power take off mechanism in a manner to absorb unbalanced torques and forces and to establish a substantially stabilized neutral axis which includes the center of gravity of the unit as well as the point of power take off, so that free motion about such axis may occur without misalignment of parts at the output end of the power transfer case.

Figure 1:
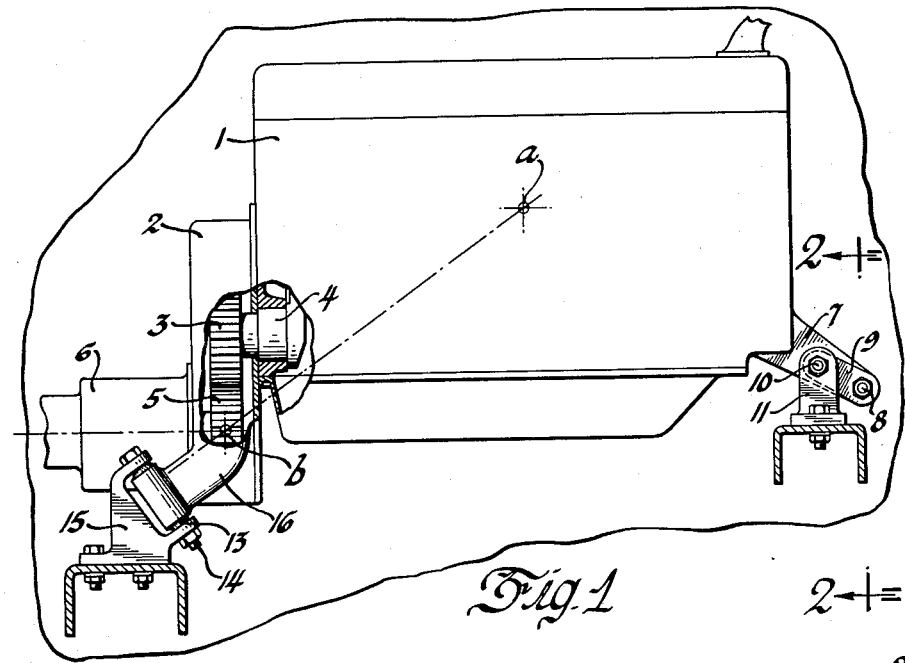
Figures 2, 3:
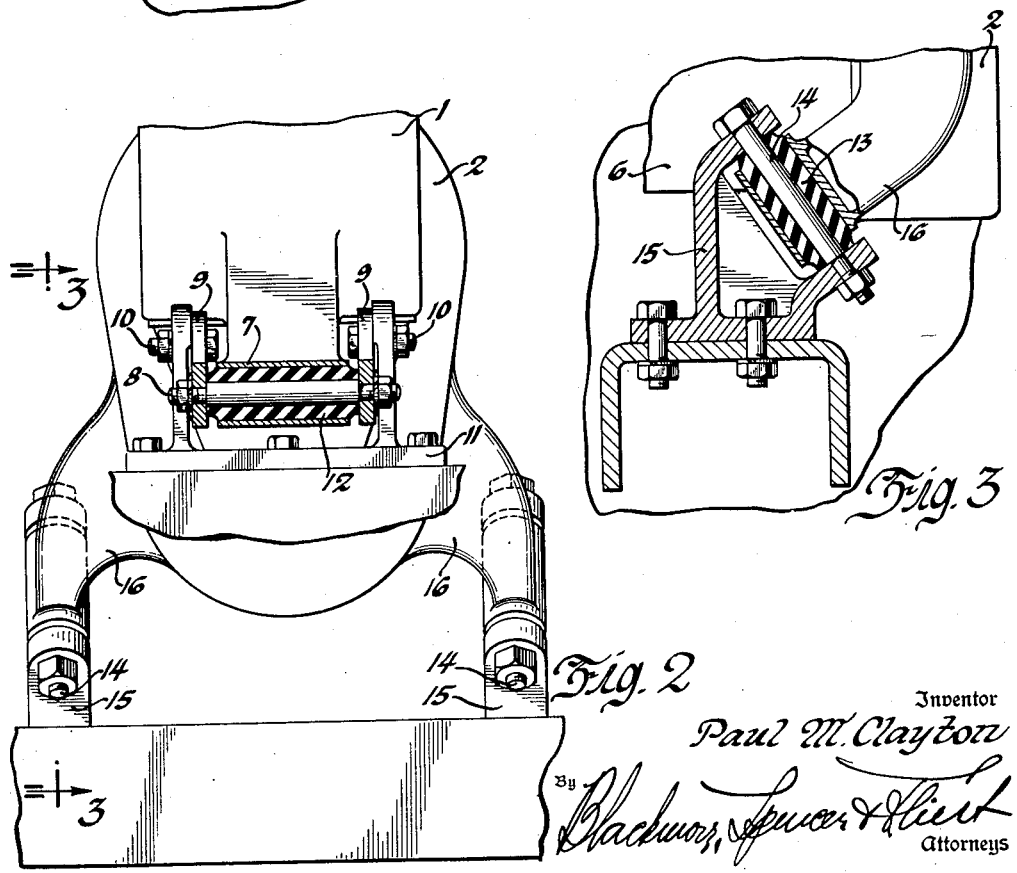

Other objects and advantages of the invention will become apparent during the course of the following specification having reference to the accompanying drawing wherein Figure 1 is a side elevation of an engine mounted according to the invention; Figure 2 is a front elevation on a larger scale with parts in section as on line 2—2 of Figure 1 and Figure 3 is a fragmentary sectional view taken on line 3—3 of Figure 2.

In the drawing the reference numeral 1 indicates a cylinder block of an internal combustion engine having rigidly secured at one end as a unit therewith a transfer case or housing 2. Enclosed by the casing is a driving gear 3 keyed on the engine crankshaft 4 and engaged with an output or driven gear 5, mounted in laterally offset relation and in spaced parallelism with the engine crankshaft. The driven gear 5 may be keyed or fixed on a short output or stub shaft for connection with a propeller shaft or the like by means of a universal joint contained within the rearward extension 6 of the transfer case.

For an engine having three points of support, as illustrated in the drawing, a single front support will be employed with a pair of supports at the rear on opposite sides of the engine center line. For the front support the engine may be provided with a forward projection 7 terminating in a cylindrical eye on a transverse horizontal axis. Within the cylindrical outer member is located a pivot pin 8 connected at opposite ends with a pair of shackle links 9 which extend upwardly and rearwardly and, in longitudinally spaced relation with the pin 8, are joined by pivot studs 10 to a pair of upstanding legs on a frame bracket 11. Between the complementary surfaces of the eye in the projection 7 and the pin 8 is a sleeve or bushing 12 of rubber or other similar elastic deformable material, the term rubber being used herein in a generic sense to include any suitable substance having the desired elasticity and other proper characteristics. Pivot joints of the type disclosed are known commercially and provide for accommodation of all relative motion by deflection in the rubber body with the inter-engaging rubber and metal surfaces being firmly attached through either surface bond or tight frictional contact.

Similar rubber joints are shown embodied in the rear support units. As seen in Figure 3 each rear support includes a rubber bushing 13 surrounding a pin 14 carried by the frame bracket 15 and being embraced within a cylindrical opening of a bearer arm 16 projected laterally from and rigid with the transfer case 2 of the engine unit. Both rear supporting units have their axes and complemental surfaces inclined upwardly and rearwardly and lie in a rearwardly tilted transverse plane, which is substantially normal to a line drawn to intersect both the center of gravity of the suspended unit and the point of power take off indicated, respectively, at $a$ and $b$ in Figure 1. By preference the supporting units at the rear are also located at a height near or containing the inclined transverse plane of the line $a$—$b$.

The arrangement of the several supporting units and their relation to each other provides ease of rotation under resilient restraint of the engine unit about the center line $a$—$b$ with greater resistance to other types of motion, resulting in substantial stabilization at the points $a$ and $b$. In other words transmitted forces are reduced in magnitude by offering slight restraint in directions such that there will be small movements of the center of gravity and the point of power take off, whereby unbalanced torques are absorbed in angular oscillations of the engine mass without creating external disturbances or interference to power take off remote a considerable distance from the crankshaft center line.

Under static load the hinge action in the front shackle mounting places its rubber body under torsion and places a shear load on the rear mountings. In case of pitching of the engine due to an unbalanced couple the front mounting will act in torsion and the rear mountings in shear. The type of mounting illustrated is extremely flexible in both shear and torsion so that little restraint is offered angular oscillation about the center of gravity $a$ on a transverse axis. For angular oscillations about the line $a$—$b$ the front mounting is placed in shear as are also the rear mountings, those on opposite sides acting in opposite directions. Other types of motion will be resisted by compression of the rubber mountings which confines free motion about the line $a$—$b$, or in other words, affords stability for the points $a$ and $b$. Slight motion at the point $b$ may be inevitable on occasion and may occur without harm because of the use of a universal joint or flexible coupling at the driven gear 5.

I claim:

1. In combination, an engine having a crankshaft, a power transfer mechanism having a power take off shaft geared to the crankshaft on an axis offset laterally from the crankshaft axis and being secured to the engine as a unit therewith, a pair of transversely spaced rear supports on opposite sides of the longitudinal center line of the unit, each comprising a tubular rubber bushing interposed between a central pin and an outer cylinder with the axis thereof inclined upwardly and rearwardly in a transverse plane normal to a forwardly and upwardly inclined line intersecting the point of power take off and unit center of gravity and a front support comprising a longitudinally projected swinging link fulcrumed to a supporting bearing and the engine on longitudinally spaced transverse axes, with at least one of its fulcrumed connections including a rubber bushing interposed between inner and outer members and arranged for action in shear to resist motion of the unit about said forwardly and upwardly inclined line.

2. In combination, an engine having a crankshaft, a power transfer mechanism having a power take off shaft geared to the crankshaft on an axis offset laterally from the crankshaft axis and being secured to the engine as a unit therewith, a resilient support for the rear of the unit comprising complemental opposed bearing surfaces and an interposed body of rubber fixed to said surfaces with the surfaces in the direction of their length extending in upwardly and rearwardly inclined relation, which in a transverse plane is substantially normal to a line intersecting the point of power take off and the unit center of gravity, and a resilient front support having a rubber body and complemental bearing surfaces secured thereto and projected transversely of the crankshaft axis, and both front and rear supports being arranged for action in shear on the rubber to resist unit motion about said line.

3. In combination, a supporting unit, an engine unit to be supported, a shackle link pivoted on longitudinally spaced transverse axes to said units at one end with at least one of the pivotal connections including an elastic bushing interposed between a central hinge pin and an outer embracing sleeve, a pair of transversely spaced connections between the units at the other end and each including an elastic bushing between a central pin fixed to one of the units and an embracing sleeve fixed to the other unit and both extending in a direction that the elastic bushing acts wholly in shear in response to forces applied thereto in a plane normal to a line which intersects approximately the point of power take off and engine center of gravity whereby the connections are more resistant to relative motion of the units in directions other than about said intersecting line.

4. In combination with a support and a power plant to be supported comprising an engine having a drive shaft with a drive gear thereon and a radially offset power take off device having a driven gear drive coupled with the drive gear on an axis spaced from the engine drive shaft axis, of mounting connections between the power plant and its support including rear connections on opposite sides of the radially offset power take off device comprising rubber confined between complementary power plant and support members in a manner that the rubber is more resistant to deflection in other directions than a direction of movement lying in a transverse plane substantially normal to a line intersecting the power plant center of gravity and the offset center of said driven gear, and a front connection constructed to accommodate power plant motion about said line of intersection and to cooperate with said rear connections in stabilizing the power plant on said line and in constraining motion to motion about said line including the center of said offset driven gear.

PAUL M. CLAYTON.